(12) United States Patent
Chung et al.

(10) Patent No.: US 6,639,746 B1
(45) Date of Patent: Oct. 28, 2003

(54) METHOD AND APPARATUS FOR RECORDING/REPRODUCING MULTI-CHANNEL DATA

(75) Inventors: Hyun-kwon Chung, Kyungki-do (KR); Young-yoon Kim, Seoul (KR); Byung-jun Kim, Suwon (KR); Yoon-woo Lee, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 118 days.

(21) Appl. No.: 09/662,870

(22) Filed: Sep. 15, 2000

(30) Foreign Application Priority Data

Sep. 16, 1999 (KR) .......................................... 1999-39910

(51) Int. Cl.[7] .............................. G11B 5/02; G11B 5/09; G11B 15/18
(52) U.S. Cl. .............................. 360/55; 360/48; 360/69
(58) Field of Search ............................ 360/55, 69, 48; 386/125, 82; 369/32

(56) References Cited

U.S. PATENT DOCUMENTS

| 6,219,311 | B1 | * | 4/2001 | Mitsuno | 369/32 |
| 6,240,244 | B1 | * | 5/2001 | Ikeda | 386/125 |
| 6,320,833 | B1 | * | 11/2001 | Nonaka et al. | 369/53.25 |

FOREIGN PATENT DOCUMENTS

| JP | 04-87075 | 3/1992 |
| JP | 05-342759 | 12/1993 |
| JP | 07-78412 | 3/1995 |
| JP | 08-87749 | 4/1996 |
| JP | 08-279976 | 10/1996 |
| JP | 10-322662 | 12/1998 |
| JP | 11-16286 | 1/1999 |
| JP | 11-39802 | 2/1999 |
| JP | 11-102574 | 4/1999 |
| JP | 11-196374 | 7/1999 |

* cited by examiner

*Primary Examiner*—Regina N. Holder
(74) *Attorney, Agent, or Firm*—Staas & Halsey LLP (57) ABSTRACT

A disc recording/reproducing apparatus for recording/reproducing multi-channel data simultaneously on a recording medium, the apparatus including channel buffers for recording/reproducing corresponding to the multi-channels, and a recording/reproducing controller for, if there is a channel buffer is filled with data to be recorded among the allocated channel buffers for recording, reading data from the channel buffer to record the data on the allocated continuous space, and if there is an empty channel buffer among the allocated channel buffers for reproducing, writing data read from the recording medium to the empty channel buffer. In the apparatus, the size of the continuous space on the recording medium, the size of the channel buffers for recording, and the size of the channel buffers for reproducing are allocated based on recording/reproducing speed information of a channel in which recording/reproducing is required according to a recording/reproducing request. Accordingly, multi-channel data can be simultaneously recorded and reproduced in real time without channel buffer overflow and underflow.

34 Claims, 8 Drawing Sheets

| AREA INFORMATION | MEDIUM WRITE/READ SPEED (BIT RATE) |
|---|---|
| A | V1 KB/sec |
| B | V2 KB/sec |
| C | V3 KB/sec |
| D | V4 KB/sec |
| E | V5 KB/sec |
| F | V6 KB/sec |
| OPTIMIZED BLOCK DATA PROCESSING UNIT : Bn KBytes | |

METHOD AND APPARATUS FOR RECORDING/REPRODUCING MULTI-CHANNEL DATA

CROSS-REFERENCE TO RELATED APPLICATIONS

This application claims the benefit of Korean Application No. 99-39910, filed Sep. 16, 1999, in the Korean Industrial Property Office, the disclosure of which is incorporated herein by reference.

BACKGROUND OF THE INVENTION

1. Field of the Invention

The present invention relates to a method of recording/reproducing multi-channel data, and more particularly, to a method of recording/reproducing multi-channel data simultaneously in real time on a recording medium which requires high-speed recording.

2. Description of the Related Art

Figure 1:
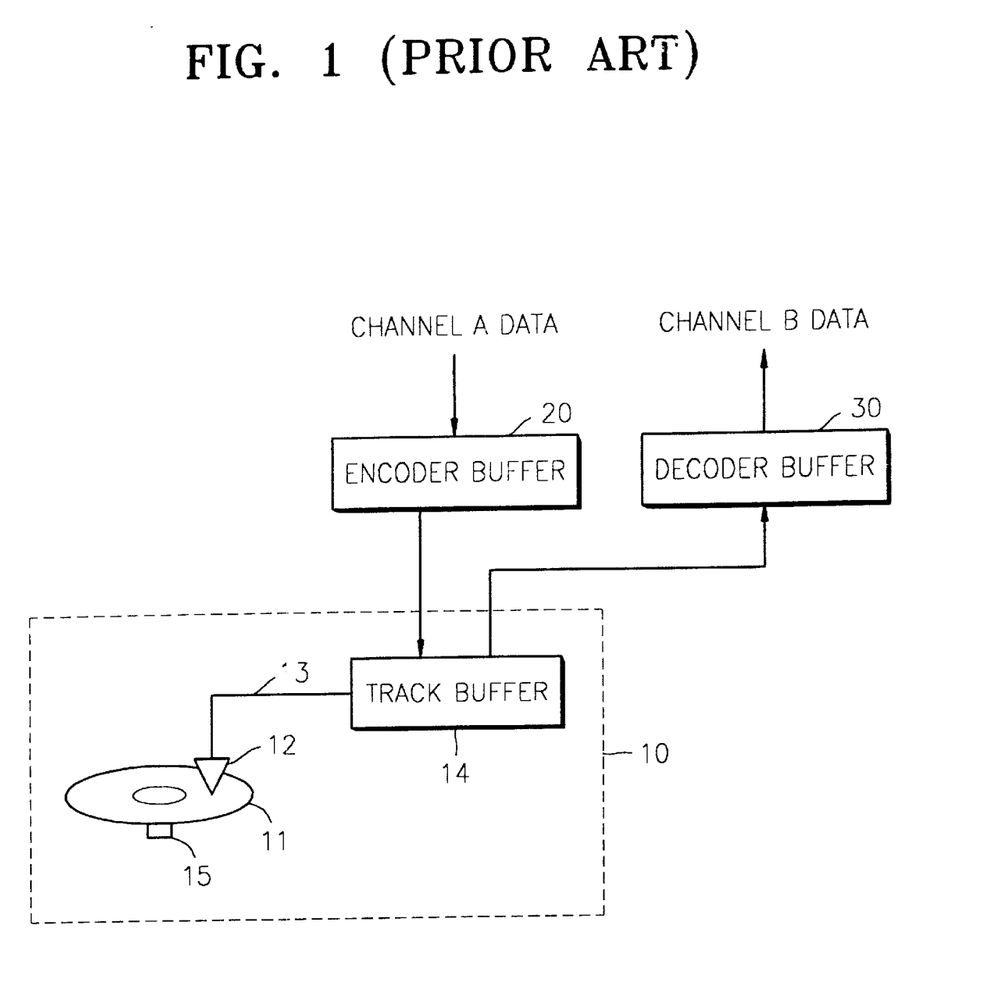
FIG. 1 illustrates a conventional recording/reproducing apparatus structure for two channel data recording/ reproducing.

A conventional recording/reproducing apparatus in which real-time audio and/or video data is recorded and reproduced on a disc medium is shown in FIG. 1. A hard disc drive (HDD) 10 has a disc 11 for recording, a recording/reproducing head 12, a head arm 13 for moving the recording/reproducing head 12, a track buffer 14 for storing data to be read or recorded, and a spindle motor 15 for revolving the disc 11.

Channel A data is signal processed for recording, stored in an encoder buffer 20, and then sent to the track buffer 14 of the HDD 10. Channel B data recorded on the disc 11 is stored in the track buffer 14 after being read from the disc 11. The data stored in the track buffer 14 is sent to a decoder buffer 30 and is reproduced.

Figure 2:
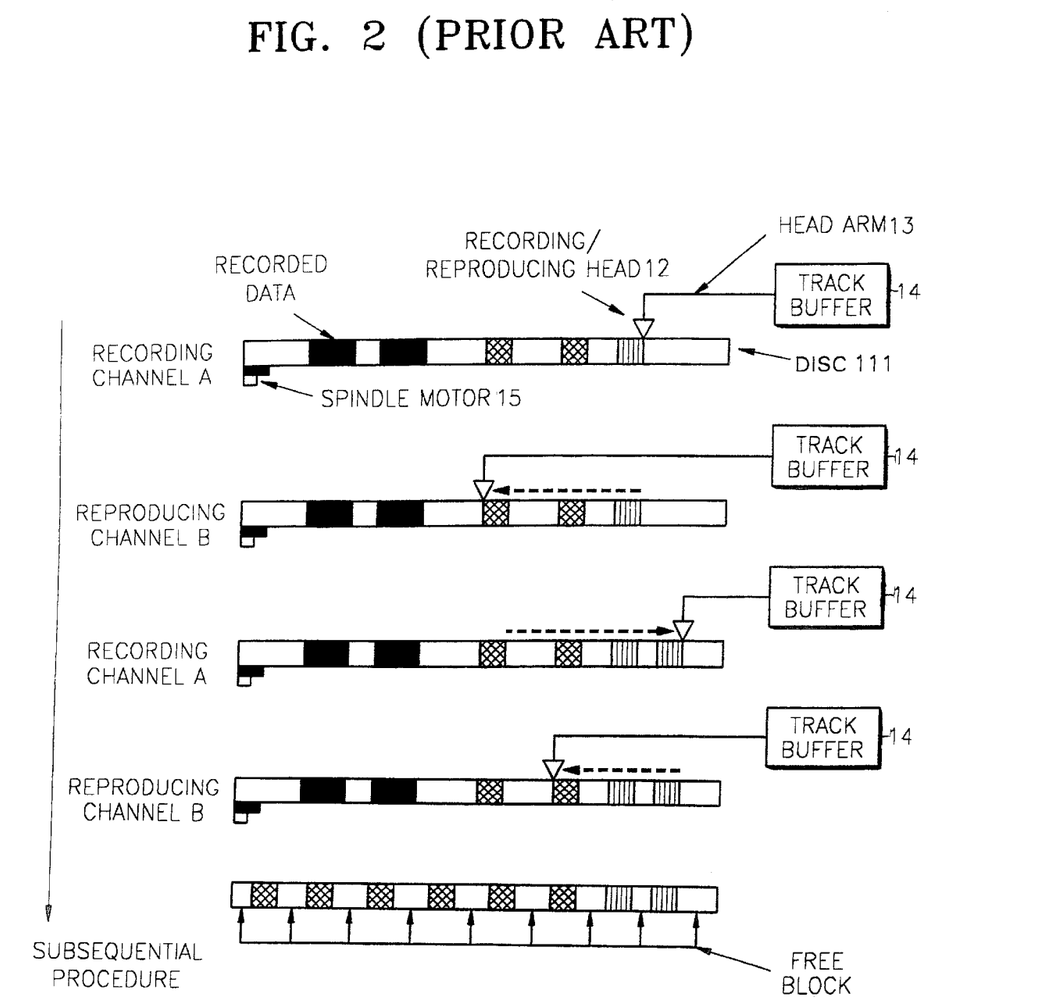
FIG. 2 illustrates two-channel recording/reproducing performed by the hard disc drive (HDD) shown in FIG. 1.

Two-channel recording/reproducing is performed in the HDD 10 of FIG. 1 as shown in FIG. 2. Channel A is a channel in which audio/video (A/V) data is to be recorded on a regularly continuous free space, and channel B is a channel in which data recorded on a regularly continuous space is to be reproduced.

The sequential procedures are repeatedly performed to accomplish simultaneous two-channel recording/reproducing as follows:

Step 1: for channel A, read data to be recorded from the track buffer 14 and record the data in a continuous free space.

Step 2: for channel B, read channel B data to write the channel B data to the track buffer 14 by moving the recording/reproducing head 12.

Step 3: again for the channel A, read data to be recorded from the track buffer 14 and record the data in a continuous free space.

Step 4: again for the channel B, read channel B data to write the channel B data to the track buffer 14 by moving the recording/reproducing head 12.

In order to record/reproduce data in real time, the A/V data must be processed so that the encoder buffer 20 of the recording/reproducing channel A does not overflow and the decoder buffer 30 of the recording/reproducing channel B does not underflow.

In the conventional art, the size of a buffer and the size of a continuous space that guarantee the bit rate of the A/V data of a single channel (one channel) are predetermined. However, since the size of the buffer and the continuous space are not predetermined when recording/reproducing two or more channels (i.e., multi-channels) the overflow of an encoder buffer 20 or the underflow of a decode buffer 30 may occur.

In addition, the frequent recording and deleting of the A/V data results in fragmentation of a free block, so that the A/V data cannot be recorded because there is a shortage of a continuous space which prevents an encoder buffer 20 overflow or a decoder buffer 30 underflow even if there is sufficient space for recording. Also, when recording/reproducing of two or more channels (i.e., when multi-channel recording/reproducing is performed) the size of the buffer and the continuous space must be considered in order to efficiently record/reproduce multi-channel data. Lastly, the characteristic of a recording medium due to a difference in the writing/reading speed between inner and outer circumferences must be considered for a recording medium such as a hard disc in which recording is performed at high speed in a uniform density by a constant angular velocity (CAV) technique.

SUMMARY OF THE INVENTION

To solve the above problems, it is a first objective of the present invention to provide a method of simultaneously recording/reproducing a plurality of audio/video (A/V) data streams on a recording medium, which requires high speed recording, in real time without a buffer overflow or underflow.

It is a second objective to provide an apparatus for simultaneously recording/reproducing a plurality of A/V data streams on a recording medium, which requires high speed recording, in real time without a buffer overflow or underflow.

Additional objects and advantages of the invention will be set forth in part in the description which follows and, in part, will be obvious from the description, or may be learned by practice of the invention.

Accordingly, to achieve the above objectives, the present invention provides a method of simultaneously recording/reproducing multi-channel data on a recording medium, the method comprising allocating the size of a continuous space on the recording medium, the size of channel buffers for recording, and the size of channel buffers for reproducing, based on the recording/reproducing speed information of a channel in which recording/reproducing is required according to a request for recording/reproducing, and, if there is a buffer filled with data to be recorded among the allocated channel buffers for recording, reading data from the buffer to record the data on the allocated continuous space, and if there is an empty buffer among the allocated channel buffers for reproducing, writing data read from the recording medium to the empty buffer.

The present invention also provides a disc recording/reproducing apparatus for recording/reproducing multi-channel data simultaneously on a recording medium, the apparatus including a plurality of channel buffers for recording/reproducing corresponding to multi-channels, and a recording/reproducing controller for, if there is a buffer filled with data to be recorded among the allocated channel buffers for recording, reading data from the buffer to record the data on the allocated continuous space, and if there is an empty buffer among the allocated channel buffers for reproducing, writing data read from the recording medium to the empty buffer. In the apparatus, the size of the continuous space on the recording medium, the size of the channel buffers for recording, and the size of the channel buffers for reproducing are allocated based on recording/ reproducing speed information of a channel in which recording/reproducing is required according to a recording/ reproducing request.

BRIEF DESCRIPTION OF THE DRAWINGS

The above objectives and advantages of the present invention will become more apparent by describing in detail a preferred embodiment thereof with reference to the attached drawings in which.

DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
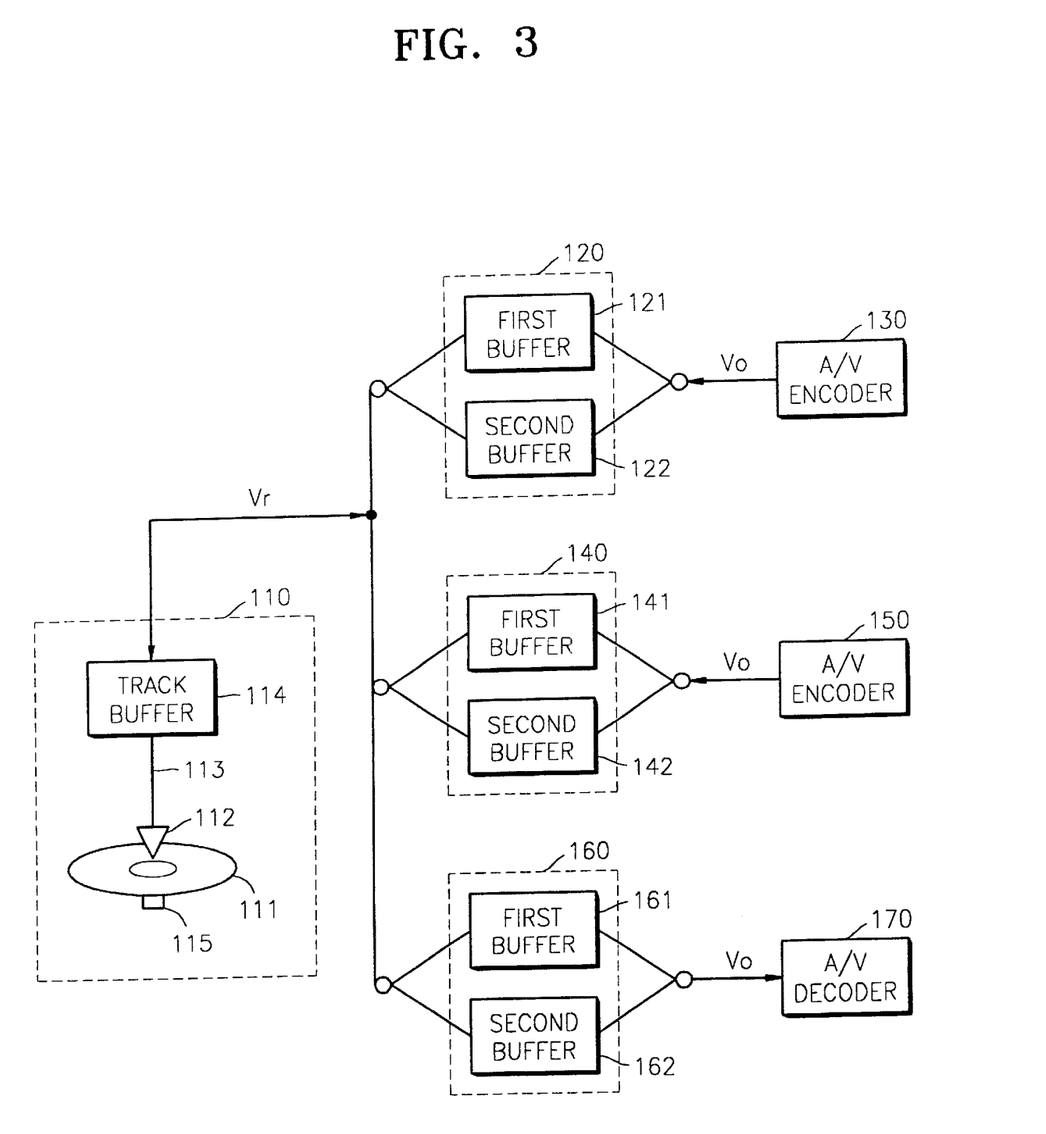
FIG. 3 illustrates a recording reproducing device for multi-channel data recording/reproducing according to an embodiment of the present invention.

An embodiment of the present invention can be applied to a general hard disc drive (HDD) device so that multi-channel data can be simultaneously recorded and reproduced. Referring to FIG. 3 which shows a structure related to recording/reproducing real-time audio/video (A/V) data according to the present invention, HDD 110 is the same as the conventional HDD 10 of FIG. 1, and channel buffers 120, 140 and 160 for recording/reproducing multi-channel (3-channel as an example) are included. The respective channel buffers 120, 140, and 160 include first buffers 121, 141, 161 and second buffers 122, 142, 162 for alternating between writing and reading operations. During recording, the channel buffers 120 and 140 read data to be recorded from A/V encoders 130 and 150, and send the data to a track buffer 114. In addition, the channel buffer 160 reads the A/V data from the track buffer 114, and sends the A/V data to an A/V decoder 170 to reproduce the data.

Here, the channel buffers 120, 140 and 160 can physically include a plurality of buffers corresponding to multi-channels, or can be implemented to logically have a plurality of channel buffer areas corresponding to the multi-channels. Furthermore, if one of the channel buffers 120 and 140 is filled with data to be recorded, the HDD 110 reads the data from the channel buffers 120 or 140 and records the data on a continuous space of the disc 111. Lastly, if there is an empty channel buffer 160 among channel buffers for reproducing, the HDD 110 reads data from the disc 111 and writes the data to the empty channel buffer 160. Thus, the HDD 110 acts as a recording/reproducing controller.

In order to record channel data on a recording medium, the channel data to be recorded is read from the channel buffers 120 and 140 to send the channel data to the track buffer 114, and in order to reproduce channel data from the recording medium, channel data stored in the track buffer 114 is read to write the channel data to the channel buffer 160, which is called channel buffering. Thus, for the implementation of multi-channel recording/reproducing, channel buffering must be performed so that a buffer overflow does not occur in the channel buffers 120 and 140 for recording, and a buffer underflow does not occur in the channel buffer 160 for reproducing. To this end, using the recording/ reproducing bit rate (also called "recording/reproducing information") of the A/V data of a channel, in which recording/reproducing is required, a continuous space on a recording medium (disc 111) is allocated and recording and reproducing are performed per unit of processing data for the allocated continuous space.

Figure 4:
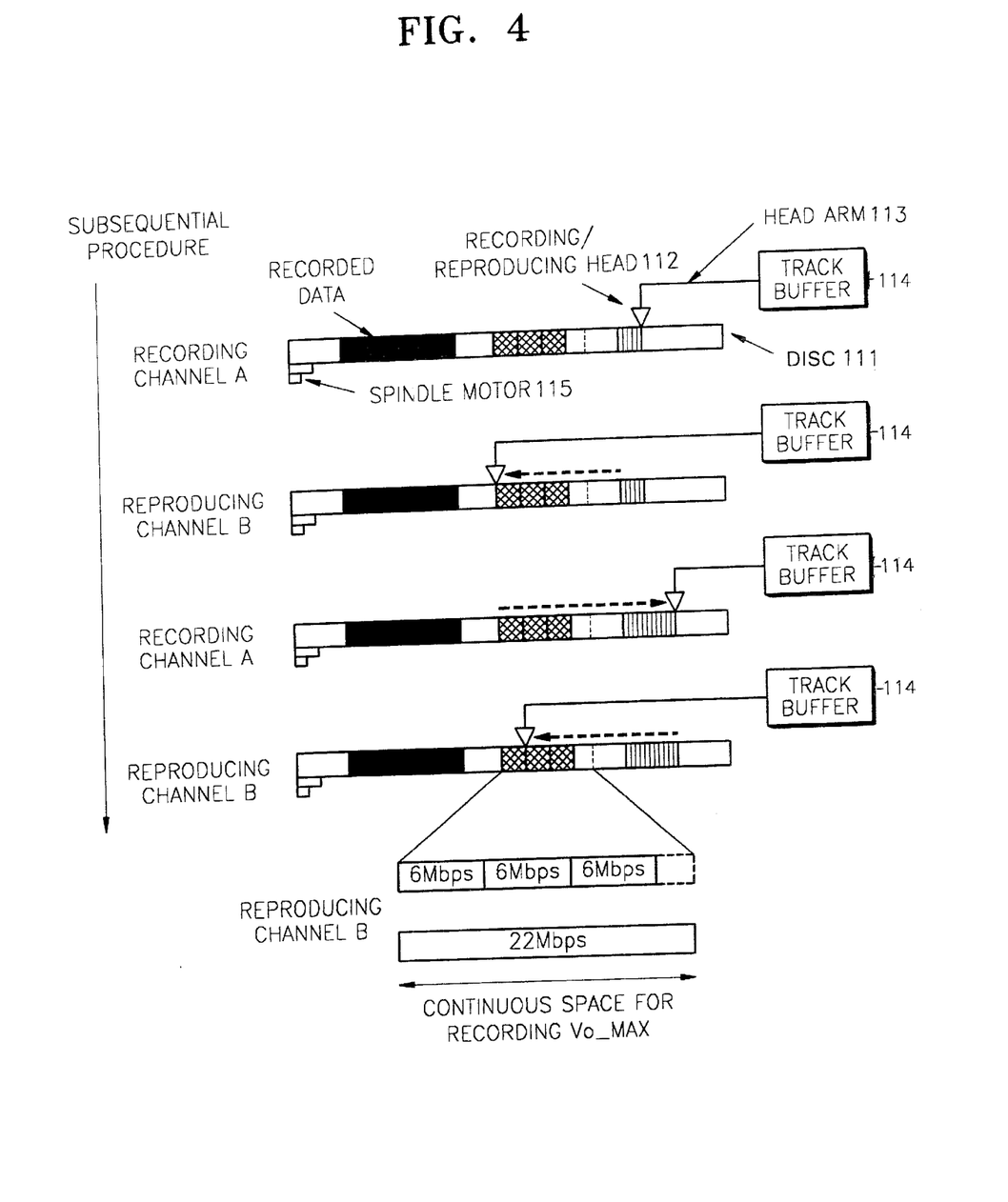
FIG. 4 illustrates two-channel recording/reproducing performed by the HDD shown in FIG. 4 according to an embodiment of the present invention.

A two-channel recording/reproducing operation performed by the HDD 110 of FIG. 3 is similar to the conventional one shown in FIG. 2, except that a continuous space is allocated for multi-channel recording/reproducing, and recording/reproducing is performed per unit of data processing for the allocated continuous space as shown in FIG. 4. Channel A is a channel in which the audio/video (A/V) data is to be recorded on a regularly continuous space in a recording medium, and channel B is a channel in which data is recorded on a regularly continuous space in the recording medium.

The sequential procedures are repeatedly performed to accomplish simultaneous two-channel recording/ reproducing as follows:

step 1: for channel A, data to be recorded per unit of data processing for a continuous space in a disc 111 is read from an A/V channel buffer 120 or 140 and recorded on an allocated continuous free space.

step 2: for channel B, channel B data is read from the disc 111 per unit of data processing for a continuous space by moving the recording/reproducing head 112, and then writing to an A/V channel buffer 160.

step 3: again for the channel A, data to be recorded per unit of data processing for a continuous space in the disc 111 is read from the A/V channel buffer 120 or 140 and recorded on an allocated continuous space.

step 4: again for the channel B, channel B data is read from the disc 111 per unit of data processing for a continuous space by moving the recording/reproducing head 112, and then writing to the A/V channel buffer 160.

Figure 7A:
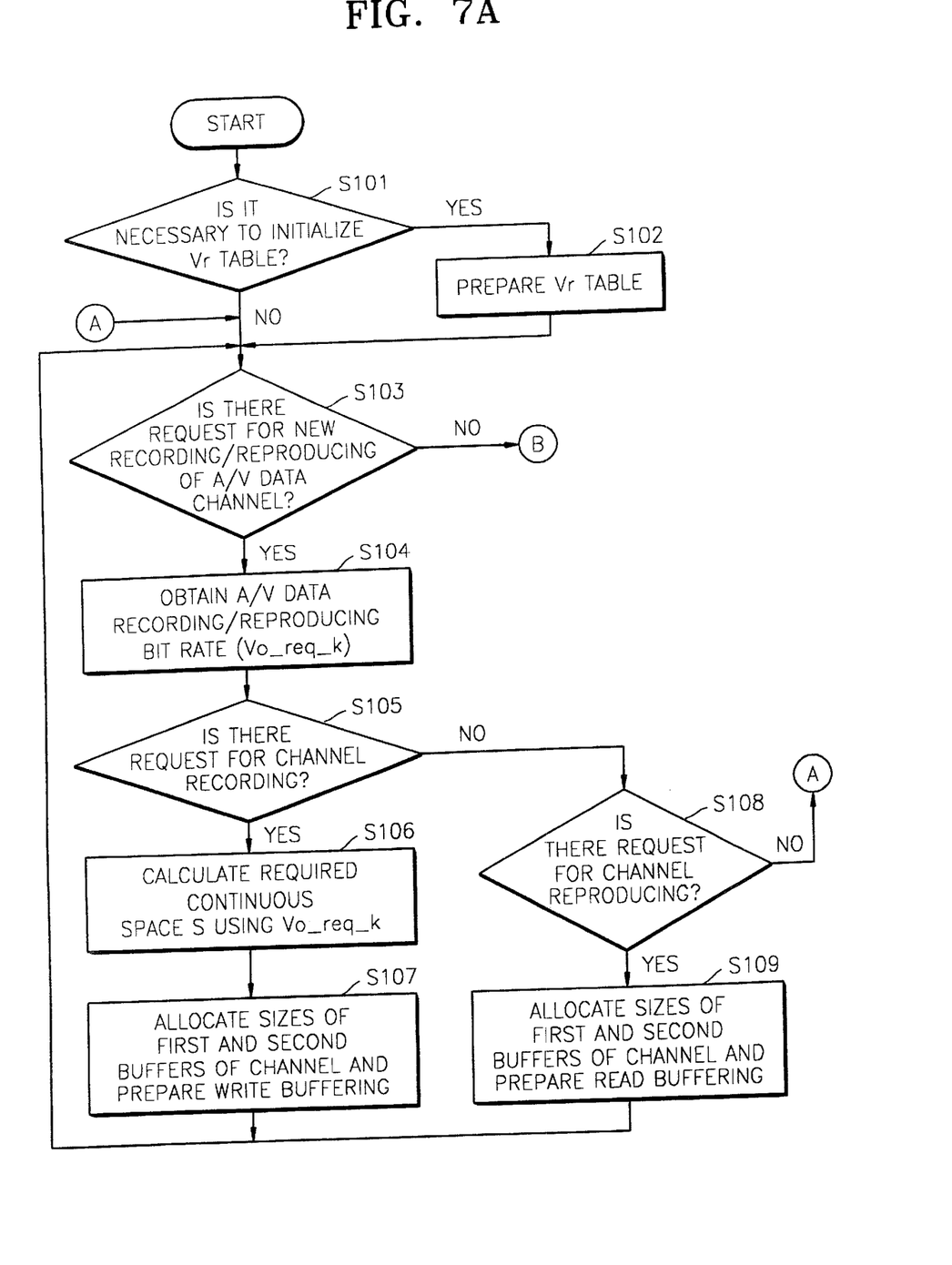
FIGS. 7A and 7B illustrate a flowchart showing a multi-channel recording/reproducing method according to an embodiment of the present invention.
Figure 7B:
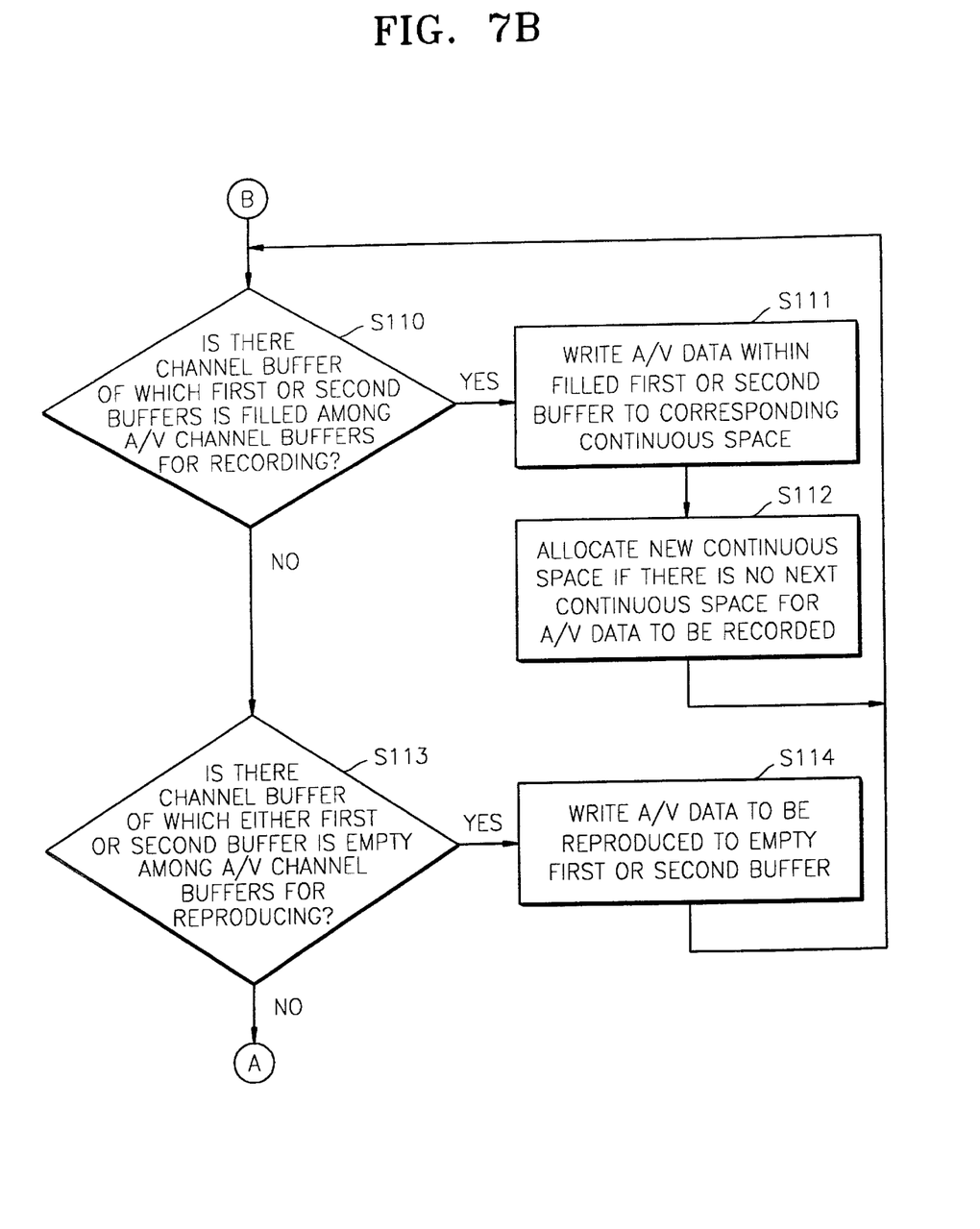

In the present invention, multi-channel data recording/ reproducing is carried out in real time (simultaneously) without a buffer overflow or buffer underflow according to procedures in a flowchart of a multi-channel data recording/ reproducing method shown in FIG. 7, using Equations (1) through (5), under the conditions of allowed bit rate restriction, channel processing time limit, maximum jump time to the next continuous space, and the summation condition of recording/reproducing bit rates of the A/V data of all channels in which recording/reproducing is required. For the following equations, $V_r$ denotes the bit rate of writing/reading of a recording medium, and $V_o$ denotes the bit rate of recording/reading of a channel in which recording/reproducing is required.

$$S = (V_{o\_max} \times T_p) \times C \quad (1)$$

In Equation (1), S denotes the size of a continuous space for the A/V data of a channel k, which is required to record/reproduce, being allocated on a disc medium, and $V_{o\_max}$ denotes a maximum value of an A/V data recording/reproducing bit rate $V_{o\_req\_k}$ of the channel k (a maximum allowable value of $V_{o\_req\_k}$, for example, is 22 Mbps). $T_p$ denotes a predetermined limit value of channel processing time (1,000 ms, for example), and C denotes an optimization constant which, for example, may be calculated as the least common multiple of $V_{o\_max}$ and $V_{o\_min}$, $V_{o\_min}$ is a minimum value of $V_{o\_req}$ (a minimum allowable value of $V_{o\_req}$, is 6 Mbps, for example).

$$D_{p\_k} = V_{o\_req} \times T_p \quad (2)$$

In Equation (2), $D_{p\_k}$ denotes an amount of data that is capable of being continuously processed from the A/V data of the channel k, and $V_{o\_req\_k}$ is an A/V data recording/reproducing bit rate (for example, 6 Mbps or 22 Mbps) of the channel k. $T_p$ denotes a predetermined limit value of channel processing time (e.g., 1000 ms).

$$B_{\_k} = V_{o\_req\_k} \times T_p \quad (3)$$

In Equation (3), $B_{\_k}$ denotes an A/V channel buffer size for the channel k (in FIG. 3, $B_{\_k}H2$ equals the sum of first buffer size and second buffer size). $V_{o\_req\_k}$ is an A/V data recording/reproducing bit rate (e.g., 6 Mbps or 22 Mbps) of the channel k, and $T_p$ is a predetermined limit value of channel processing time (e.g., 1000 ms).

Figure 5A:
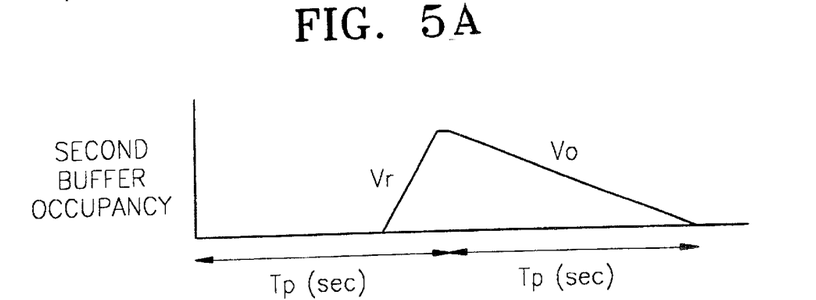
FIG. 5A illustrates the state of a first channel buffer shown in FIG. 3.
Figure 5B:
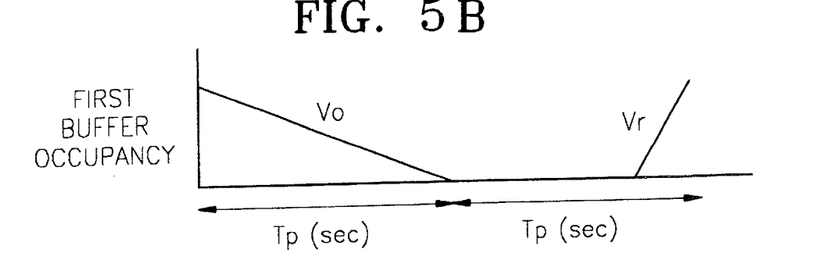
FIG. 5B illustrates that state of a second channel buffer shown in FIG. 3.

As shown in FIGS. 5A and 5B, while the A/V data is read out of a first buffer during a first limit value $T_p$ of channel processing time, other A/V data is written to a second buffer before the first $T_p$ lapses. Alternately, while the A/V data is read out of the second buffer during the second $T_p$, other A/V data is written to the first buffer before the second $T_p$ lapses. By controlling the writing and reading to be alternately performed in the first and second buffers, the respective A/V channel buffers are not subjected to overflow or underflow conditions.

$$T_{p\_k} = \frac{D_{p\_k}}{V_{rt\_min} + T_j} \quad (4)$$

Figure 6A:
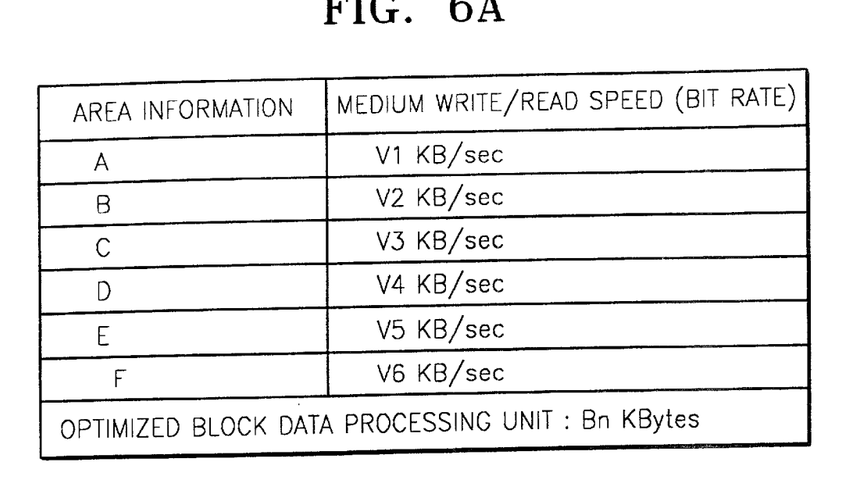
FIG. 6A illustrates an example of a table structure for storing speed information of a disc medium.

In Equation (4), $T_{p\_k}$ is a time equivalent to the sum of the time required for processing the A/V data equivalent to the data amount $D_{p\_k}$ when a write/read speed $V_{rt}$ of a recording medium area for recording and reproducing the A/V data of the channel k is $V_{rt\_min}$. $V_{rt\_min}$ is the minimum write/read speed in a $V_r$ table as shown in FIG. 6A, and $T_j$ is the maximum seek time (e.g., 20 ms) required between different continuous spaces. Furthermore, if recording/reproducing is processed faster than a time equivalent to $T_{p\_k}$, defection management can be performed for the remaining time.

Figure 6B:
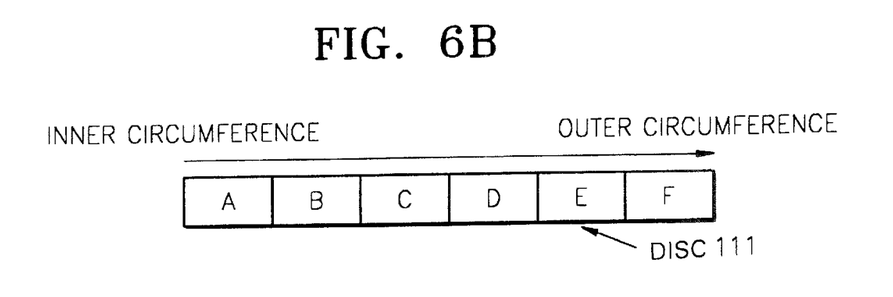
FIG. 6B illustrates a cross section of a disc on which the area information shown in FIG. 6 is recorded.

Meanwhile, as shown in FIG. 6A, when a disc medium is initialized, the write/read speed information (write/read bit rate information of the disc medium) and information on an optimized block data processing unit are tabulated (hereinafter, referred to as "$V_r$ table"). Furthermore, the relationship between $V_r$ table shown in FIG. 6A and a disc 111 is shown in FIG. 6B. In FIG. 6B, the area between the inner and outer circumferences is divided into six areas, A, B, C, D, E and F for convenience. The size areas are divided based on the difference in write/read speed.

$$T_p > \sum_{k=1}^{n} T_{p\_k} \quad (5)$$

In Equation (5), n denotes the number of channels. Equation (5) shows that the sum of all $T_{p\_k}$ values is less than a limit value of channel processing time, $T_p$. As an example, assuming that the permitted bit rate restriction is in the range of 6–22 Mbps, a maximum jump time to the next continuous space is 20 ms, the sum ($V_{ch}$) of $V_{o\_req}$ values of all channels is 66 Mbps, and the channel processing time is 1,000 ms, continuous data processing amount $D_{p\_k}$ and a continuous space S for recording the A/V data having $V_{o\_req}$ of 6 Mbps are calculated per area as shown in Table 1, where the optimization constant C is 1.

TABLE 1

| Area information | Medium write/read speed | Continuous data processing amount and continuous space for processing 6 Mbps |
|---|---|---|
| A | 1,600 KB/sec | 733 KB, 2,623 KB |
| B | 1,550 KB/sec | 733 KB, 2,623 KB |
| C | 1,500 KB/sec | 733 KB, 2,623 KB |
| D | 1,400 KB/sec | 733 KB, 2,623 KB |
| E | 1,200 KB/sec | 733 KB, 2,623 KB |
| F | 1,000 KB/sec | 733 KB, 2,623 KB |

Optimized block data processing unit : 32 KB

It can be found in Table 1 that, for recording/reproducing of the A/V data of 6 Mbps, a continuous space of 2,623 KB is allocated per area and 733 KB data is processed in units of 32 KB at one time so that a restriction on an allowed bit rate may be met.

As another example, assuming that the permitted bit rate restriction is in the range of 6–22 Mbps, the maximum jump time to the next continuous space is 20 ms, the sum $V_{ch}$ of $V_{o\_req}$ of all channels is 66 Mbps, and channel processing time is 1,000 ms, continuous data processing amount $D_{p\_k}$ and a continuous space S for recording the A/V data having $V_{o\_req}$ of 22 Mbps are calculated per area as shown in Table 2, where the optimization constant C is 1.

TABLE 2

| Area information | Medium write/read speed | Continuous data processing amount and continuous space for processing 6 Mbps |
|---|---|---|
| A | 1,600 KB/sec | 2,623 KB, 2,623 KB |
| B | 1,550 KB/sec | 2,623 KB, 2,623 KB |
| C | 1,500 KB/sec | 2,623 KB, 2,623 KB |
| D | 1,400 KB/sec | 2,623 KB, 2,623 KB |
| E | 1,200 KB/sec | 2,623 KB, 2,623 KB |
| F | 1,000 KB/sec | 2,623 KB, 2,623 KB |

Optimized block data processing unit: 32 KB

Table 2 demonstrates that, for recording/reproducing of 6 Mbps A/V data, a continuous space of 2,623 KB is allocated per area and 733 KB data is processed in units of 32 KB at one time so that the required bit rate condition may be met.

FIGS. 7A and 7B are flowcharts showing the multi-channel data recording/reproducing method according to an embodiment of the present invention. The method includes preparing a $V_r$ table (steps S101 and S102), allocating a continuous space and a channel buffer (steps S103–S109), and recording data in the allocated continuous space and reproducing data stored therein (steps S110–S114).

More specifically, it is determined whether there is a need to initialize a $V_r$ table which stores write/read speed information of each area on a disc medium (step S101). If it is determined that initialization of the $V_r$ table is required in the step S101, recording/reproducing bit rate information and optimized block processing unit information of each area of the recording medium are newly stored (step S102). Thus, the steps S101 and S102 are performed when the $V_r$ table is initialized.

On the other hand, if there is no need to initialize the $V_r$ table in the step S101, it is determined whether there is a request for new recording/reproducing of an A/V data channel (step S103). If there is a new recording/reproducing request of the A/V data channel in the step S103, the A/V data recording/reproducing bit rate of a corresponding area, in which recording/reproducing is required, is obtained from a user via a user interface, considering the signal processing capability of the A/V data recording/reproducing system (step S104).

Next, it is determined whether there is a request for recording of a channel (step S105). If it is determined that there is a recording request of the channel, a required continuous space S is calculated by Equation (1) using $V_{o\_req\_k}$ the A/V data recording/reproducing bit rate of the channel obtained in step S104 (step S106). The first and second buffers of the channel are allocated based on the continuous data processing amount $D_{p\_k}$ within a continuous space calculated by Equation (2), and write buffering is prepared (step S107). Thereafter, the process returns to step S103 to determine whether there is a request for new recording/reproducing of an A/V data channel.

If it is determined that there is no request for recording of a channel (step S105), it is determined whether there is a request for reproducing of the channel (step S108). If there is a request for reproducing, the sizes of first and second buffers of a channel are allocated based on continuous data processing amount $D_{p\_k}$ within a continuous space calculated by Equation (2), and read buffering is prepared (step S109). Thereafter, the process returns to the step S103.

If it is determined that there is no request for reproducing in the step S108, the process returns to the step S103.

However, if there is no request for new recording/reproducing of an A/V data channel at step S105 as shown in FIG. 7B, it is determined whether there is an A/V channel buffer of which a first or a second buffer is filled with data among the A/V channel buffers for recording (step S110). If there is, the A/V data within the filled first or second buffer is written to a corresponding continuous space of the recording medium (step S111). If there is no next continuous space for data to be recorded, a new continuous space is then allocated (step S112), and the step S110 of determining whether there is a channel buffer filled with data is performed again.

If it is determined that there is no channel buffer of which first and second buffers are filled with data among the A/V channel buffers for reproducing in the step S110, then it is determined whether there is a channel buffer of which either first or second buffer is empty (step S113). If there is, the A/V data to be reproduced is written to the empty first buffer or second buffer (step S114), and if there is no empty channel buffer, then the process returns to the step S103.

Figure 8A:
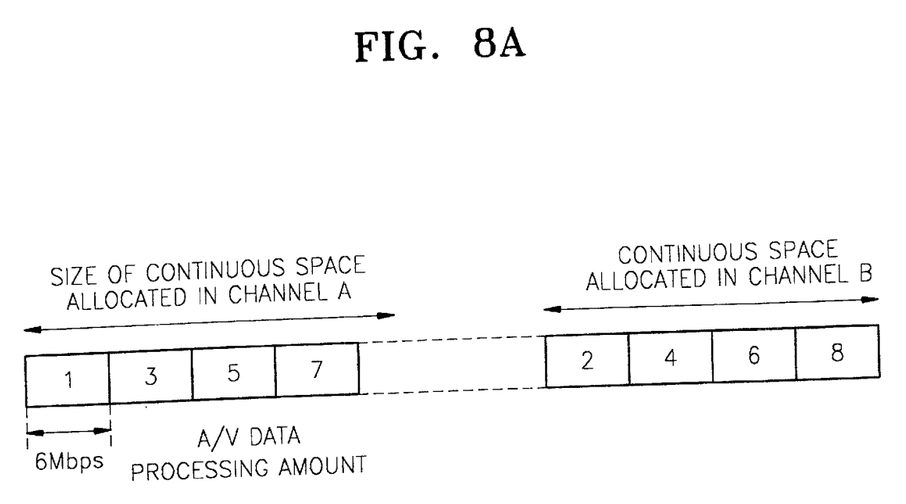
FIGS. 8A and 8B illustrate examples of methods of allocating continuous spaces required for two-channel recording and reproducing according to an embodiment of the present invention.

FIG. 8A shows the sequential procedures of a method of allocating a continuous space required for 6 Mbps two-channel recording and reproducing according to the multi-channel data recording/reproducing method shown in FIGS. 7A and 7B. The details thereof are as follows:

step 1: allocate a continuous space in a channel A and record data corresponding to space 1.

step 2: reproduce data corresponding to space 2 of a channel B.

step 3: record data corresponding to space 3 of the channel A.

step 4: reproduce data corresponding to space 4 of the channel B.

step 5: record data corresponding to space 5 of the channel A.

step 6: reproduce data corresponding to space 6 of the channel B.

step 7: record data corresponding to space 7 of the channel A.

step 8: reproduce data corresponding to space 8 of the channel B.

Figure 8B:
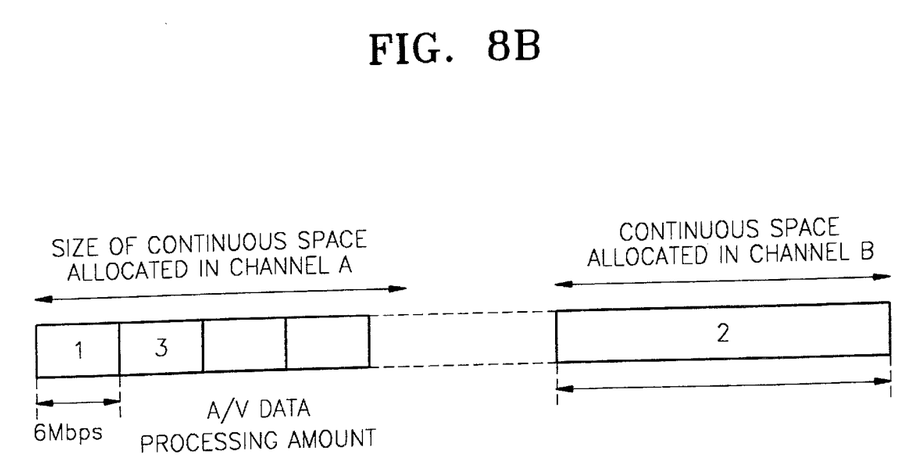

FIG. 8B shows a method of allocating a continuous space required for 6 Mbps channel A recording, and 22 Mbps channel B reproducing according to the multi-channel data recording/reproducing method shown in FIGS. 7A and 7B. The details thereof are as follows:

step 1: allocate a continuous space in a channel A and record data corresponding to space 1.

step 2: reproduce data corresponding to space 2 of a channel B.

step 3: record data corresponding to space 3 of the channel A.

A channel buffering method proposed by the present invention can include a channel buffer within a HDD to replace a track buffer within the HDD.

If the present invention is applied to household electric appliances for video recording which use discs, a recorded movie can be watched while a different movie is recorded at the same time. In particular, the present invention is capable of recording and reproducing multi-channels in devices such as HDDs, and can be applied to trick play features, such as time shift play in devices like digital versatile discs (DVDs).

When the present invention is applied to a high speed disc medium, multi-channel A/V data streams can be recorded and reproduced simultaneously. Thus, the present invention allows real-time recording/reproducing of multi-channel data that cannot be implemented with a video cassette recorder (VCR) which is a single channel A/V data recording device using a conventional tap recording medium.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of simultaneously recording/reproducing multi-channel data on a recording medium, the method comprising:

allocating a size of a continuous space on the recording medium, a size of channel buffers for recording, and a size of channel buffers for reproducing, based on a recording speed and a reproducing speed of a channel in which recording/reproducing is required according to a request for recording/reproducing;

if there is a channel buffer filled with data to be recorded among allocated channel buffers for recording, reading the data from the channel buffer to record the data on the allocated continuous space; and if there is an empty channel buffer among allocated channel buffers for reproducing, writing data read from the recording medium to the empty channel buffer.

2. The method of claim 1, further comprising storing on the recording medium the recording and reproducing speeds as recording/reproducing speed information corresponding to the recording medium.

3. The method of claim 2, wherein the recording/reproducing speed information comprises write/read bit rates of each area of the recording medium.

4. The method of claim 3, wherein the recording/reproducing speed information further comprises optimized block processing unit information.

5. The method of claim 1, wherein said allocating further comprises determining the size of the continuous space by a product of a maximum value of a recording/reproducing bit rates of the channel in which recording/reproducing is required, a limit value of the channel processing time, and an optimization constant.

6. The method of claim 5, wherein the determining further comprises determining the optimization constant as the least common multiple of allowable recording/reproducing bit rates of the channel in which recording/reproducing is required.

7. The method of claim 1, wherein said allocating further comprises determining the sizes of the channel buffers for recording and the channel buffers for reproducing by a product of the recording/reproducing speeds of the channel in which recording/reproducing is required and a limit value of channel processing time.

8. The method of claim 1, wherein
said allocating further comprises calculating both the continuous space size and a continuous data processing unit for the allocated continuous space by using recording/reproducing bit rates for the channel in which recording/reproducing is required,
said writing of the data comprises recording channel data per the continuous data processing unit, and
said reading of the data comprises reproducing channel data per the continuous data processing unit.

9. The method of claim 1, further comprising allocating a new continuous space if there is no next continuous space for data to be recorded after the data to be recorded per allocated continuous space is recorded.

10. A method of simultaneously recording/reproducing multi-channel data on a recording medium, the method comprising:
allocating a size of a continuous space on the recording medium, a size of channel buffers for recording, and a size of channel buffers for reproducing, based on recording/reproducing speed information of a channel in which recording/reproducing is required according to a request for recording/reproducing;
if there is a channel buffer filled with data to be recorded among allocated channel buffers for recording, reading the data from the channel buffer to record the data on the allocated continuous space; and
if there is an empty channel buffer among allocated channel buffers for reproducing, writing data read from the recording medium to the empty channel buffer,
further comprising performing defection management for a remaining amount of time if recording/reproducing is performed faster than a sum of a time for processing a continuous data amount with a minimum value of a recording/reproducing bit rate of the channel in which recording/reproducing is required, and a maximum seek time between a continuous space and a different continuous space.

11. A disc recording/reproducing apparatus for recording/reproducing multi-channel data simultaneously on a recording medium, the apparatus comprising:
a plurality of channel buffers for recording/reproducing corresponding to multi-channels; and
a recording/reproducing controller, wherein
if one of said channel buffers is filled with data to be recorded among the allocated channel buffers for recording, reading the data from said buffer to record the data on the allocated continuous space, and
if at least one of said channel buffers is empty among the allocated channel buffers for reproducing, writing data read from the recording medium to said empty channel buffer,
wherein a size of the continuous space on the recording medium, a size of said channel buffers for recording, and a size of said channel buffers for reproducing are allocated based on a recording speed and a reproducing speed of a channel in which recording/reproducing is required according to a recording/reproducing request.

12. The apparatus of claim 11, wherein
each said channel buffer comprises first and second buffers, and
said recording/reproducing controller
reads the data from the first buffer during a limit value ($T_p$) of a channel processing time while data is written to the second buffer before the time equivalent to $T_p$ lapses, and
alternately, reads the data out of the second buffer during $T_p$ while data is written to the first buffer before $T_p$ lapses.

13. The apparatus of claim 11, wherein said plurality of channel buffers are logically divided into two or more channel buffers in one memory, corresponding to multi-channels such as two or more channels in which recording/reproducing is required.

14. The apparatus of claim 11, wherein said recording/reproducing controller determines a size of the continuous space by a product of a maximum value of a recording/reproducing bit rates of the channel, in which recording/reproducing is required, a limit value of a channel processing time, and an optimization constant.

15. The apparatus of claim 11, wherein said recording/reproducing controller determines the sizes of said channel buffers for recording and said channel buffers for reproducing by a product of the recording/reproducing speeds of the channel in which recording/reproducing is required and a limit value of a channel processing time.

16. A disc recording/reproducing apparatus for recording/reproducing multi-channel data simultaneously on a recording medium, the apparatus comprising:
a plurality of channel buffers for recording/reproducing corresponding to multi-channels; and
a recording/reproducing controller, wherein
if one of said channel buffers is filled with data to be recorded among the allocated channel buffers for recording, reading the data from said buffer to record the data on the allocated continuous space, and
if at least one of said channel buffers is empty among the allocated channel buffers for reproducing, writing data read from the recording medium to said empty channel buffer,
wherein:
a size of the continuous space on the recording medium, a size of said channel buffers for recording, and a size of said channel buffers for reproducing are allocated based on a recording/reproducing speed information of a channel in which recording/reproducing is required according to a recording/reproducing request, said recording/reproducing controller determines a size of the continuous space by a product of a maximum value of a recording/reproducing bit rate of the channel, in which recording/reproducing is required, a limit value of a channel processing time, and an optimization constant, and said recording/reproducing controller determines the optimization constant as the least common multiple of maximum and minimum values of the recording/reproducing bit rate of the channel in which recording/reproducing is required.

17. A method of recording/reproducing multi-channel data on a recording medium, comprising:

allocating a size of continuous spaces on the recording medium and a size of channel buffers based on channel information for respective channels in which recording/reproducing is required according to a request for recording/reproducing;

reading data from one of the channel buffers to record the data on one allocated continuous space at a first bit rate such that there is no buffer overflow; and writing data read from another allocated continuous space on the recording medium at a second bit rate to another of the channel buffers such that there is no buffer underflow, wherein the size of each of the one and another continuous spaces corresponds to a larger of the first and second bit rates.

18. The method of claim 17, wherein the channel buffers comprise channel buffers for recording and channel buffers for reproducing, and said allocating comprises allocating the size of the channel buffers for recording, and allocating the size of the channel buffers for reproducing.

19. The method of claim 17, wherein said reading or the data and said writing of the data is per unit of data processing within respective allocated continuous spaces.

20. The method of claim 17, wherein said writing of the data comprises:

determining if one of the channel buffers is filled with data to be recorded; and reading the data from the filled channel buffer to record the data on the allocated continuous space; and said reading of the data comprises:

determining if one of the channel buffers is empty; and reading the data to be reproduced from the recording medium to the empty channel buffer.

21. The method of claim 17, wherein one of the channel buffers comprises first and second buffers, and said writing of the-data comprises reading data from the first buffer while writing the data to the second buffer during a predetermined limit value of channel processing time.

22. The method of claim 21, wherein another of the channel buffers comprises first and second buffers, and said reading of the data comprises reading the data from the first buffer while writing the data to the second buffer during the predetermined limit value of channel processing time.

23. A method of recording/reproducing multi-channel data on a recording medium, comprising:

allocating a size of continuous spaces on the recording medium and a size of channel buffers based on channel information for respective channels in which recording/reproducing is required according to a request for recording/reproducing;

reading data from one of the channel buffers to record the data on the allocated continuous space such that there is no buffer overflow; and writing data read from the allocated continuous space on the recording medium to another of the channel buffers such that there is no buffer underflow, wherein said allocating comprises:

determining a maximum value of a data recording bit rate and a data reproducing bit rate for each corresponding channel, and calculating the continuous space for each corresponding channel based upon the maximum value of the data recording/reproducing bit rates for the corresponding channel and a predetermined limit value of channel processing time.

24. The method of claim 23, wherein:

the calculating comprises calculating the continuous space (S) for each corresponding channel as follows:

$$S=(V_{o\_max} \times T_p) \times C, \text{ and}$$

$V_{o\_max}$ is the maximum value of the data recording/reproducing bit rates for the corresponding channel, $T_p$ is the predetermined limit value of channel processing time, and C is an optimization constant.

25. The method of claim 24, wherein said allocating further comprises:

calculating a channel buffer size for each corresponding channel based upon the data recording/reproducing bit rates for the corresponding channels and a predetermined limit value of channel processing time.

26. A computer readable medium encoded with processing instructions for implementing a method performed by a computer, the method comprising:

allocating a size of continuous spaces on the recording medium and a size of channel buffers based on channel information for respective channels in which recording/reproducing is required according to a request for recording/reproducing;

reading data from one of the channel buffers to record the data on one allocated continuous space at a first bit rate such that there is no buffer overflow; and writing data read from another allocated continuous space on the recording medium to another of the channel buffers at a second bit rate such that there is no buffer underflow, wherein the size of each of the one and another continuous spaces corresponds to a larger of the first and second bit rates.

27. The computer readable medium of claim 26, wherein the channel buffers comprise channel buffers for recording and channel buffers for reproducing, and said allocating comprises allocating the size of the channel buffers for recording, and allocating the size of the channel buffers for reproducing.

28. The computer readable medium of claim 26, wherein said of the reading data and said writing of the data is per unit of data processing within respective allocated continuous spaces.

29. The computer readable medium of claim 26, wherein said writing of the data comprises:
   determining if one of the channel buffers is filled with data to be recorded; and
   reading the data from the filled channel buffer to record the data on the allocated continuous space; and
said reading of the data comprises:
   determining if one of the channel buffers is empty; and
   reading the data to be reproduced from the recording medium to the empty channel buffer.

30. The computer readable medium of claim 26, wherein one of the channel buffers comprises first and second buffers, and
said writing of the data comprises reading data from the first buffer while writing the data to the second buffer during a predetermined limit value of channel processing time.

31. The computer readable medium of claim 30, wherein said allocating further comprises:
   calculating a channel buffer size for each channel based upon the data recording/reproducing bit rates for the channel and a predetermined limit value of channel processing time.

32. The computer readable medium of claim 30, wherein another of the channel buffers comprises first and second buffers, and
said reading of the data comprises reading the data from the first buffer while writing the data to the second buffer during the predetermined limit value of channel processing time.

33. A computer readable medium encoded with processing instructions for implementing a method performed by a computer, the method comprising:
   allocating a size of continuous spaces on the recording medium and a size of channel buffers based on channel information for respective channels in which recording/reproducing is required according to a request for recording/reproducing;
   reading data from one of the channel buffers to record the data on the allocated continuous space such that there is no buffer overflow; and
   writing data read from the allocated continuous space on the recording medium to another of the channel buffers such that there is no buffer underflow,
wherein said allocating comprises:
   determining a maximum value of data recording/reproducing bit rates for each corresponding channel, and
   calculating the continuous space for each corresponding channel based upon the maximum value of the data recording/reproducing bit rates for the corresponding channels and a predetermined limit value of channel processing time.

34. The computer readable medium of claim 33, wherein:
the calculating comprises calculating the continuous space (S) for each channel as follows:

$$S = (V_{o\_max} \times T_p) \times C, \text{ and}$$

$V_{o\_max}$ is the maximum value of the data recording/reproducing bit rates for the channel, $T_p$ is the predetermined limit value of channel processing time, and C is an optimization constant.

* * * * *

UNITED STATES PATENT AND TRADEMARK OFFICE
CERTIFICATE OF CORRECTION

PATENT NO.    : 6,639,746 B1
DATED         : October 28, 2003
INVENTOR(S)   : Hyun-kwon Chung et al.

It is certified that error appears in the above-identified patent and that said Letters Patent is hereby corrected as shown below:

<u>Column 12,</u>
Line 29, change "x" to -- X --, both occurrences.

<u>Column 14,</u>
Line 28, change "x" to -- X --, both occurrences.

Signed and Sealed this

Second Day of March, 2004

JON W. DUDAS
*Acting Director of the United States Patent and Trademark Office*